United States Patent
Morimoto (10) Patent No.: US 9,092,169 B2
(45) Date of Patent: Jul. 28, 2015

(54) DEVICE-DRIVER INSTALLATION WITH VISUAL CONFIRMATION

(71) Applicant: KYOCERA Document Solutions Inc., Osaka (JP)

(72) Inventor: Toshimitsu Morimoto, Osaka (JP)

(73) Assignee: KYOCERA Document Solutions Inc. (JP)

( * ) Notice: Subject to any disclaimer, the term of this patent is extended or adjusted under 35 U.S.C. 154(b) by 0 days.

(21) Appl. No.: 14/283,283

(22) Filed: May 21, 2014

(65) Prior Publication Data

US 2014/0347686 A1    Nov. 27, 2014

(30) Foreign Application Priority Data

May 21, 2013   (JP) .................................. 2013-107509

(51) Int. Cl.
*G06F 3/12* (2006.01)
*G06F 9/44* (2006.01)
*G06F 3/0482* (2013.01)

(52) U.S. Cl.
CPC ............ *G06F 3/1225* (2013.01); *G06F 3/0482* (2013.01); *G06F 3/1203* (2013.01); *G06F 3/1284* (2013.01); *G06F 9/4411* (2013.01)

(58) Field of Classification Search
USPC ............................................... 358/1.13, 1.15
See application file for complete search history.

(56) References Cited

U.S. PATENT DOCUMENTS

| 2009/0037903 | A1 | 2/2009 | Asai | |
| 2011/0075207 | A1* | 3/2011 | Nakata | 358/1.15 |
| 2011/0145812 | A1* | 6/2011 | Kong et al. | 717/178 |
| 2012/0033242 | A1* | 2/2012 | Naegele et al. | 358/1.13 |
| 2012/0257236 | A1* | 10/2012 | Nagashima | 358/1.13 |
| 2013/0301069 | A1* | 11/2013 | Yanagi | 358/1.13 |

FOREIGN PATENT DOCUMENTS

JP   2009-037536 A   2/2009

* cited by examiner

*Primary Examiner* — Qian Yang
(74) *Attorney, Agent, or Firm* — McDonnell Boehnen Hulbert & Berghoff LLP (57) ABSTRACT

A non-transitory recording medium includes an installer program that causes a computer within an information processing device to function as a device list generation unit, a display control unit, and an installation processing unit. The device list generation unit generates a device list. The display control unit causes the device list to be displayed in a first display area; causes a driver list to be displayed in a second display area; causes the device selected from the device list to be displayed in a third display area; and causes the driver selected from the driver list to be displayed corresponding to the device displayed in the third display area. The installation processing unit installs, into the information processing device, the driver displayed corresponding to the device.

9 Claims, 6 Drawing Sheets

DEVICE-DRIVER INSTALLATION WITH VISUAL CONFIRMATION

INCORPORATION BY REFERENCE

This application is based upon, and claims priority to corresponding Japanese Patent Application No. 2013-107509, filed in the Japan Patent Office on May 21, 2013, the entire contents of which are incorporated herein by reference.

FIELD

Unless otherwise indicated herein, the description in this field section or the background section is not prior art to the claims in this application and is not admitted to be prior art by inclusion in this section. The present disclosure relates to a non-transitory recording medium storing an installer program and an installation method.

BACKGROUND

A typical information processing device connected to a plurality of devices via a local area network typically searches for one or more device for which the information processing device lacks a driver for controlling the device. The information processing device then displays a list of devices identified by the search. An appropriate driver is selected from the list by a user and is installed into the information processing device to allow the information processing device to control that identified device.

While the above-described mechanism makes it for the user to select a device driver to be installed into an information processing device, when several drivers exist for the same device, it becomes more difficult for the user to make such a selection.

SUMMARY

The present disclosure relates to a non-transitory recording medium storing an installer program and an installation method. The installer program enables a user to select, with visual confirmation, a device where a driver is to be installed into an information processing device, and a driver to be installed for the device, when a plurality of drivers exist for one device.

A non-transitory recording medium according to an embodiment of the present disclosure includes an installer program. The installer program causes a computer within an information processing device to function as a device list generation unit, a display control unit, and an installation processing unit.

The device list generation unit generates a device list indicating which devices communicate with the information processing device.

The display control unit causes each of the following to occur: (i) a first display area, a second display area, and a third display area to be displayed within one screen, (ii) the device list to be displayed in the first display area, (iii) a driver list to be displayed in the second display area, (iv) the device selected from the device list to be displayed in the third display area, and (v) the driver selected from the driver list to be displayed corresponding to the device displayed in the third display area.

The installation processing unit installs, into the information processing device, the driver displayed corresponding to the device.

Additional features and advantages are described herein, and will be apparent from the following Detailed Description and the figures.

BRIEF DESCRIPTION OF FIGURES

All drawings are intended to illustrate some aspects and examples of the present disclosure. The drawings described are only schematic and are non-limiting, and are not necessarily drawn to scale.

DETAILED DESCRIPTION

Various embodiments are described below with reference to the figures. It should be understood, however, that numerous variations from the depicted arrangements and functions are possible while remaining in the scope and spirit of the claims. For instance, one or more elements may be added, removed, combined, distributed, substituted, re-positioned, re-ordered, and/or otherwise changed. Further, where this description refers to one or more functions being implemented on and/or by one or more devices, one or more machines, and/or one or more networks, it should be understood that one or more of such entities could carry out one or more of such functions by themselves or in cooperation, and may do so by application of any suitable combination of hardware, firmware, and/or software. For instance, one or more processors may execute one or more sets of programming instructions as at least part of carrying out one or more of the functions described herein.

Figure 1:
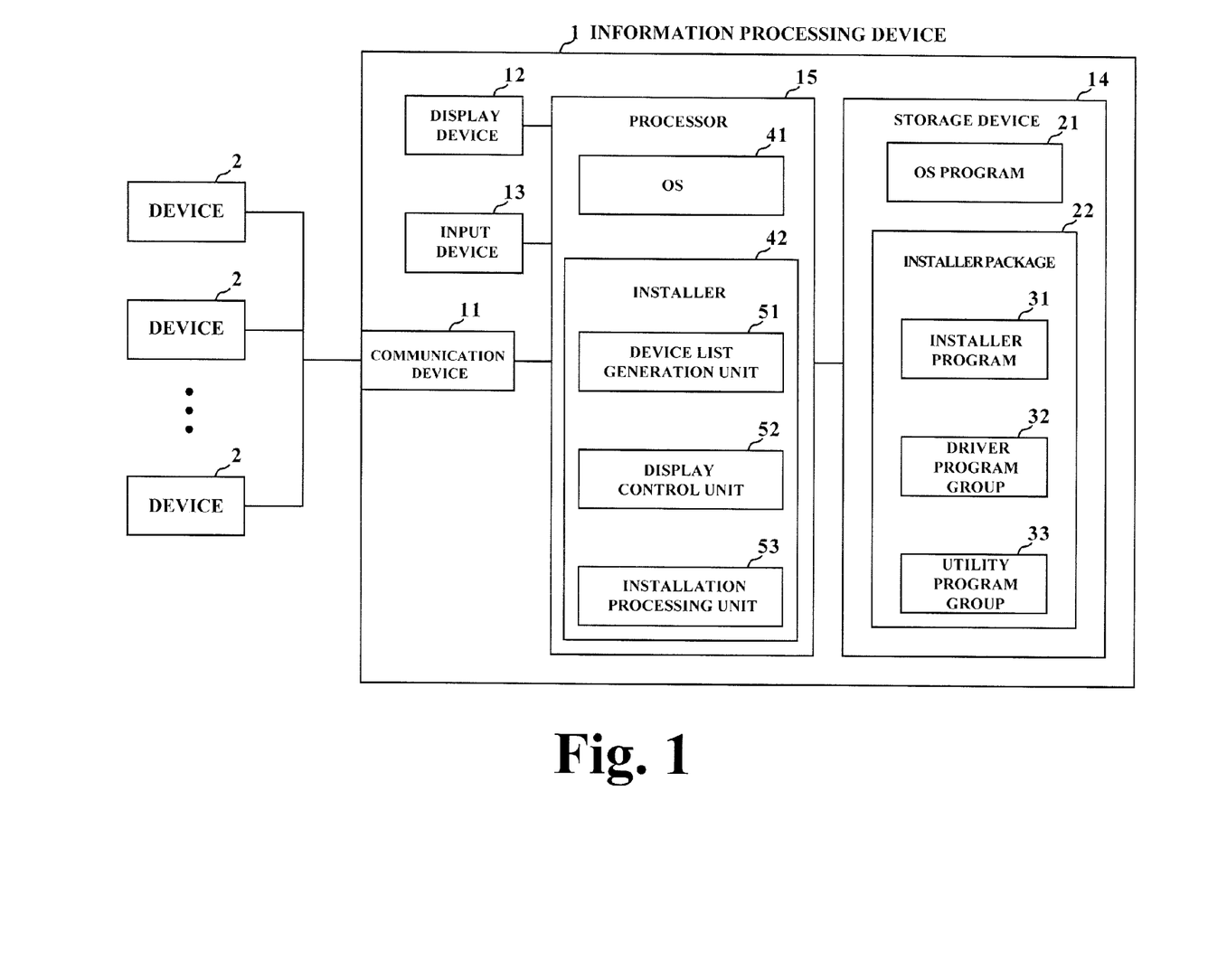
FIG. 1 is a schematic diagram illustrating a block configuration of a system where a driver for a device is installed into an information processing device in accordance with an installer program stored in a non-transitory recording medium according to an embodiment of the present disclosure.

FIG. 1 is a schematic diagram illustrating the block configuration of a system where a driver for a device is installed into an information processing device in accordance with an installer program stored in a non-transitory recording medium according to an embodiment of the present disclosure.

In the system illustrated in FIG. 1, the plurality of devices 2 are connected to the information processing device 1 via a network or a peripheral device interface such as a universal serial bus (USB). The information processing device 1 is a personal computer or the like, and the devices 2 are electronic devices such as multifunction peripheral (MFP) and printers, for example.

The information processing device 1 includes a communication device 11, a display device 12, an input device 13, a storage device 14, and a processor 15.

The communication device 11 performs data communication with the devices 2 via the network or the peripheral device interface.

The display device 12 displays various kinds of screens on a display, such as a liquid crystal display.

The input device 13 receives a user operation, and may include a keyboard, a mouse, and/or a touch panel, for example.

The storage device 14 is a non-volatile memory storing various kinds of programs and data, and may include a hard disk drive or a flash memory, for example.

In the storage device 14, an OS program 21 of an operating system (OS) and an installer package 22 are stored.

For example, the installer package 22 may be downloaded from a server on the network and stored. Alternatively, a drive device for a recording medium in which the installer package 22 is recorded, such as a CD-ROM, may be connected to the processor 15, and the installer package 22 may be read out from the recording medium using the drive device.

The installer package 22 includes an installer program 31, a driver program group 32, and a utility program group 33.

The driver program group 32 and the utility program group 33 are programs of drivers and utilities installable into the information processing device 1, and the installer program 31 is a program for installing a driver and a utility, based on the driver program group 32 and the utility program group 33.

The processor 15 includes a computer having a central processing unit (CPU), a read only memory (ROM), and a random access memory (RAM). A program may be loaded into the RAM and executed in the CPU, thereby realizing various kinds of processing units.

For example, by executing the OS program 21, an operating system 41 is realized, and by executing the installer program 31, an installer 42 is realized.

The installer 42 includes a device list generation unit 51, a display control unit 52, and an installation processing unit 53.

The device list generation unit 51 generates a device list of the devices 2 that communicate with the information processing device 1.

Figure 2:
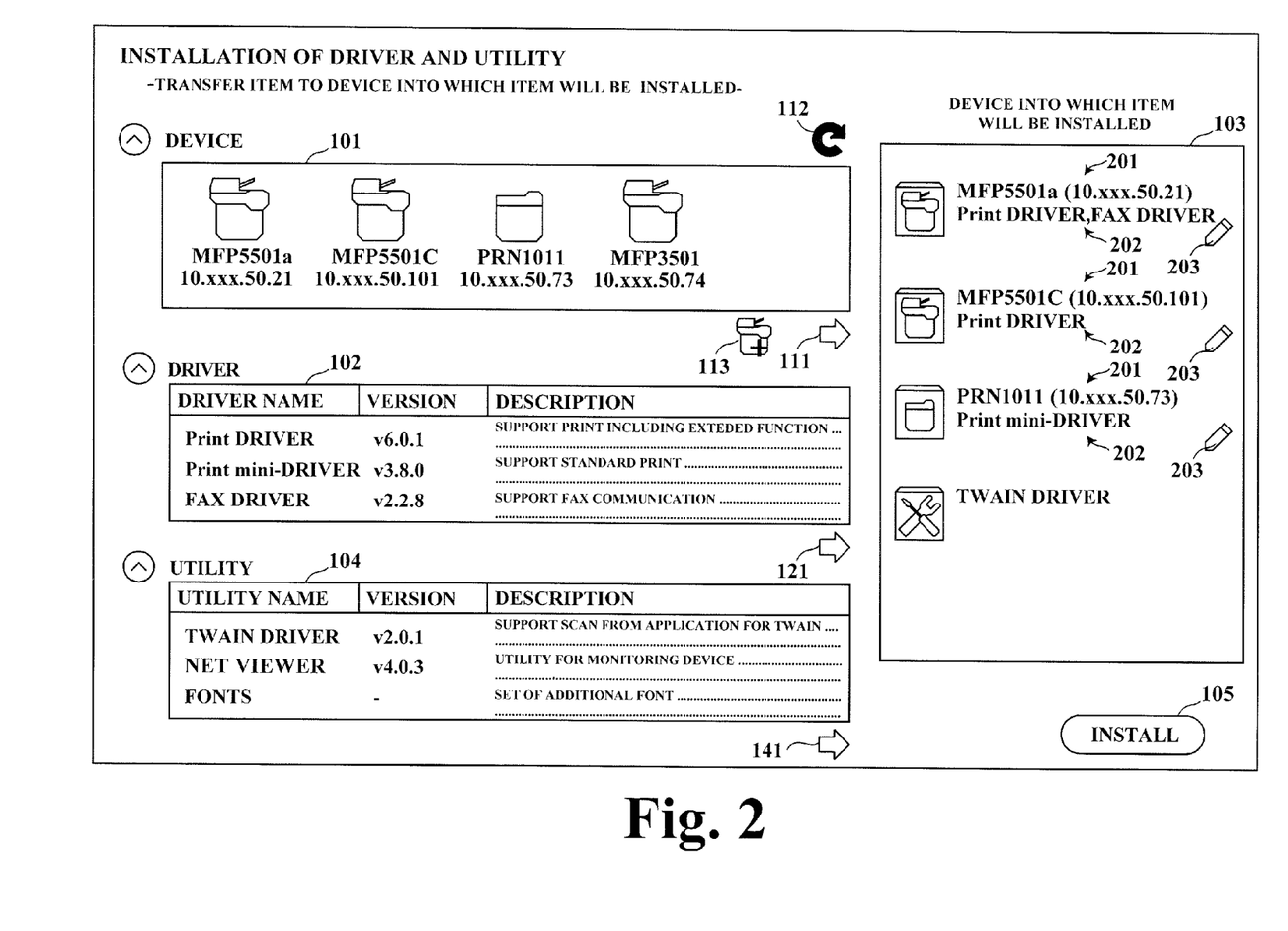
FIG. 2 is a schematic diagram illustrating an example of an operation screen displayed by the installer program.

When the installer 42 is activated, the display control unit 52 causes the display device 12 to display an operation screen. FIG. 2 is a schematic diagram illustrating an example of the operation screen displayed by the installer program 31.

The display control unit 52 causes a first display area 101, a second display area 102, and a third display area 103 to be displayed within one operation screen. The display control unit 52 also causes, in the first display area 101, the device list thereof to be displayed and causes the driver list of the driver program group 32 to be displayed in the second display area 102. In addition, the display control unit 52 causes one device 201 or a plurality of devices 201 selected from the device list displayed in the first display area 101 to be displayed in the third display area 103. The display control unit 52 further causes one driver 202 or the plurality of drivers 202 to be displayed, the one driver 202 or the plural drivers 202 being selected, with respect to one of the displayed devices 201, from the driver list displayed in the second display area 102, and associated with one of the displayed devices 201.

For example, as illustrated in FIG. 2, in the first display area 101, for each device in the device list, an icon indicating a device type, a device type name, and an IP address are displayed. As shown, the devices of the device type names, "MFP5501a", "MFP5501C", and "MFP3501", in FIG. 2 are the MFPs, and the device of the device type name, "PRN1011", is the printer. In addition, "Print DRIVER" and "Print mini-DRIVER" are the drivers for print functions, and "FAX DRIVER" is the driver for a facsimile communication function.

In this embodiment, the device type name and a network identifier (here, the IP address) are displayed for one of the devices 201, below which the driver name is displayed.

In addition, the display control unit 52 further causes a fourth display area 104 to be displayed, causes a utility list of the utility program group 33 to be displayed in the fourth display area 104, and causes one utility or the plurality of utilities selected from the utility list to be displayed in the third display area 103.

Furthermore, the display control unit 52 causes a soft key 111 to be displayed, and if the soft key 111 is activated, the display control unit 52 causes the device to be displayed in the third display area 103, the device being selected from among the devices within the device list displayed in the first display area 101 when the soft key 111 is activated.

Furthermore, the display control unit 52 causes a soft key 112 to be displayed, and if the soft key 112 is activated, the device list generation unit 51 generates the device list again, and the display control unit 52 updates the device list displayed in the first display area 101 using the regenerated device list.

Furthermore, the display control unit 52 causes a soft key 113 to be displayed, and if the soft key 113 is activated, the display control unit 52 causes an input screen for manually adding the device to the device list to be displayed. After that, the device input using the input screen is added to the device list displayed in the first display area 101.

Furthermore, the display control unit 52 causes a soft key 121 to be displayed, and if the soft key 121 is activated, the display control unit 52 causes the driver to be displayed corresponding to one of the devices 201, selected from among the devices 201 displayed in the third display area 103 when the soft key 121 is activated, the driver being selected from among the drivers within the driver list displayed in the second display area 102 when the soft key 121 is activated.

Furthermore, the display control unit 52 causes a soft key 141 to be displayed, and if the soft key 141 is activated, the display control unit 52 causes the utility to be displayed in the third display area 103, the utility being selected from among utilities within the utility list displayed in the fourth display area 104 when the soft key 141 is activated.

Furthermore, the display control unit 52 causes icons 203 to be displayed corresponding to the devices 201 and/or the drivers 202 displayed in the third display area 103. If one of the icons 203 is activated, the display control unit 52 causes a setting screen 300 (see FIG. 3) for inputting the setting value of the driver 202 to be displayed.

Figure 3:
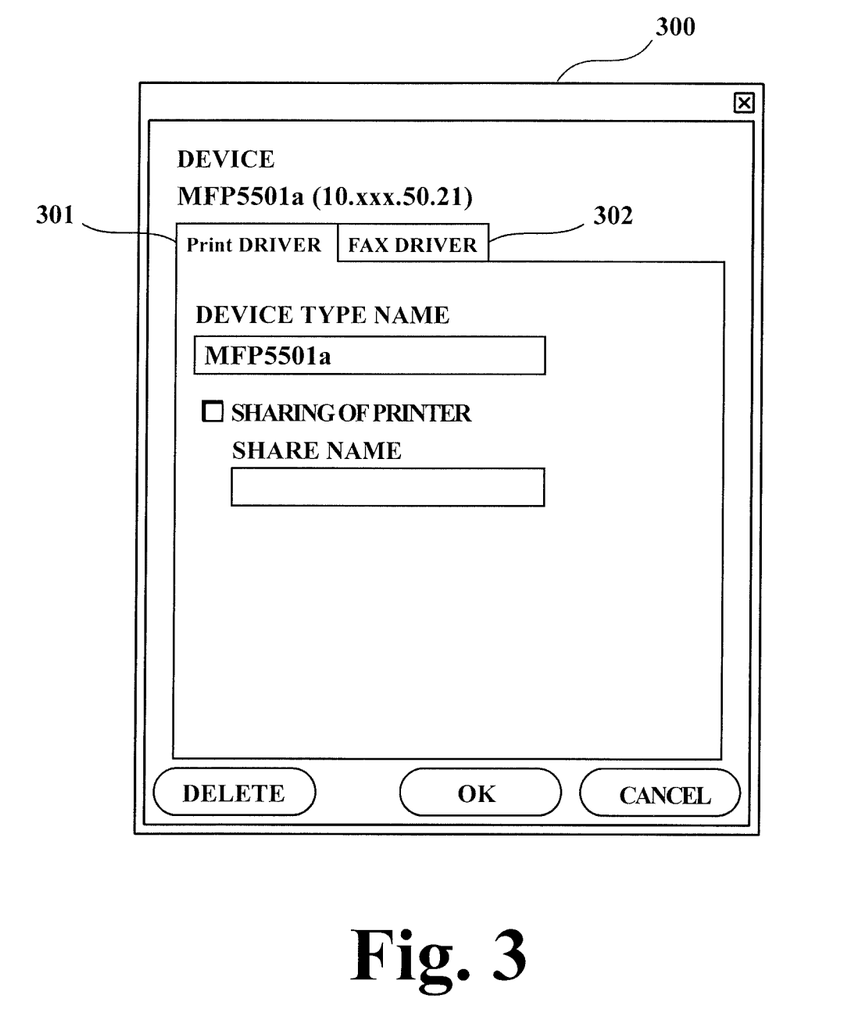
FIG. 3 is a schematic diagram illustrating an example of a setting screen for the driver displayed when an icon in FIG. 2 is activated.

FIG. 3 is a schematic diagram illustrating an example of the setting screen 300 for the driver displayed when one of the icons 203 in FIG. 2 is activated. The setting screen 300 illustrated in FIG. 3 corresponds to the driver of the device, "MFP5501a", in FIG. 2.

If one of the icons 203 is activated when the plural drivers 202 (for example, two drivers, "Print DRIVER" and "FAX DRIVER", in FIG. 2) are displayed with being associated with one device 201 displayed in the third display area 103, the display control unit 52 causes a plurality of tabs 301 and 302 for inputting the respective setting values of the plural drivers to be displayed in the setting screen 300, as illustrated in FIG. 3.

When an installation key 105 displayed in the operation screen is activated, the installation processing unit 53 installs the driver 202 displayed corresponding to the device 201 in the third display area 103, into the information processing device 1 as the driver for the device 201. In other words, the installation processing unit 53 reads out the program of the driver 202 from the driver program group 32 in the installer package 22, and incorporates the program of the driver 202 as a portion of the OS program 21.

Furthermore, when the utility is displayed in the third display area 103, the installation processing unit 53 installs, into the information processing device 1, the utility displayed in the third display area 103, along with the driver. In other words, the installation processing unit 53 reads out the program of the utility from the utility program group 33 in the installer package 22, and incorporates the program as the portion of the OS program 21 or registers the program as an application.

Furthermore, when the setting value of the driver 202 is input using the setting screen 300, the installation processing unit 53 sets the setting value as an initial value of the setting value of the installed driver.

In addition, the selection of the device in the device list, the selection of the driver in the driver list, the selection of the utility in the utility list, the activation (for example, pressing down) of the installation key 105, the activations (for example, pressing down) of the soft keys 111, 112, 113, 121, and 141, and the activation (for example, pressing down) of the icon 203 are performed by the user operating the input device 13.

Next, an installation process based on the above-described installer program 31 will be explained.

Figure 4:
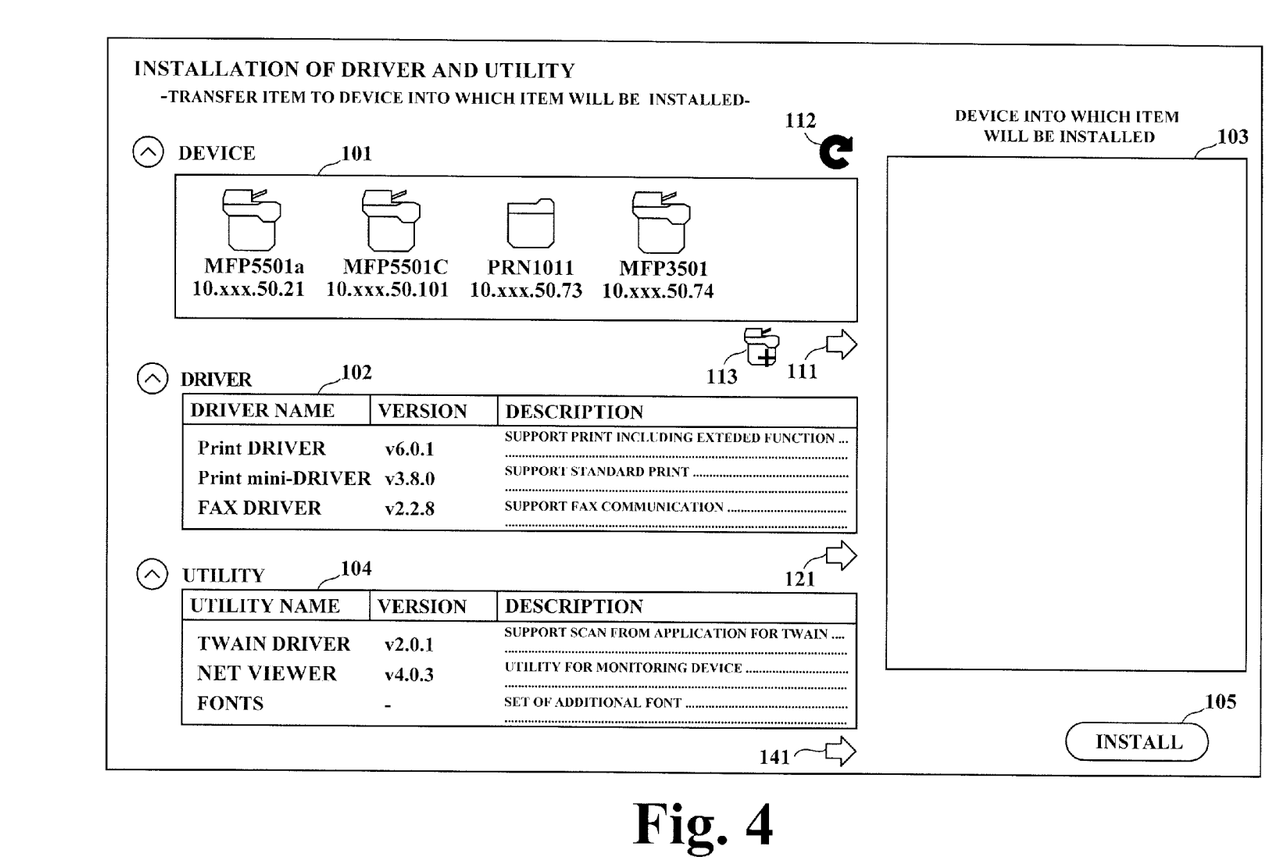
FIG. 4 is a schematic diagram explaining selection of the device and a selection procedure for the driver for the selected device (1/3).
Figure 5:
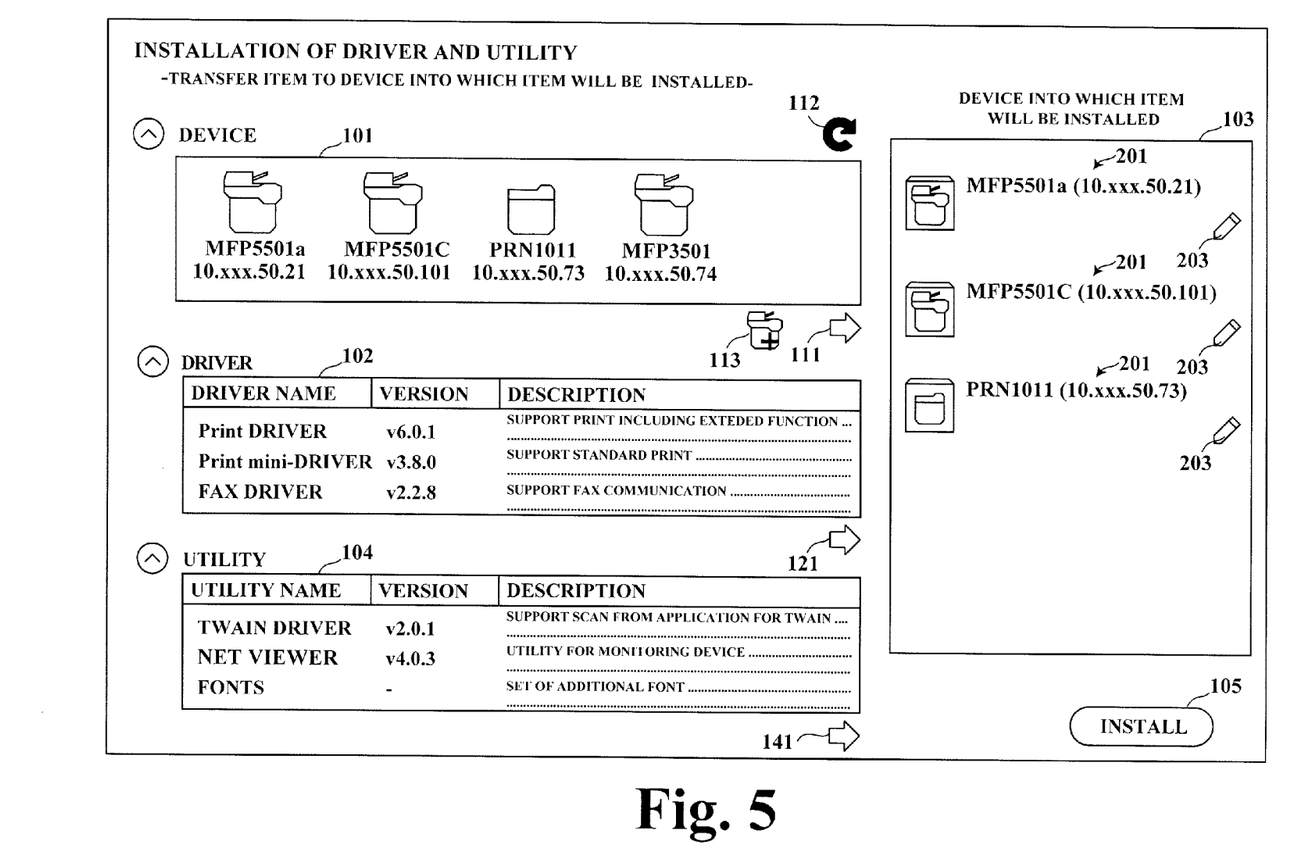
FIG. 5 is a schematic diagram explaining the selection of the device and the selection procedure for the driver for the selected device (2/3).
Figure 6:
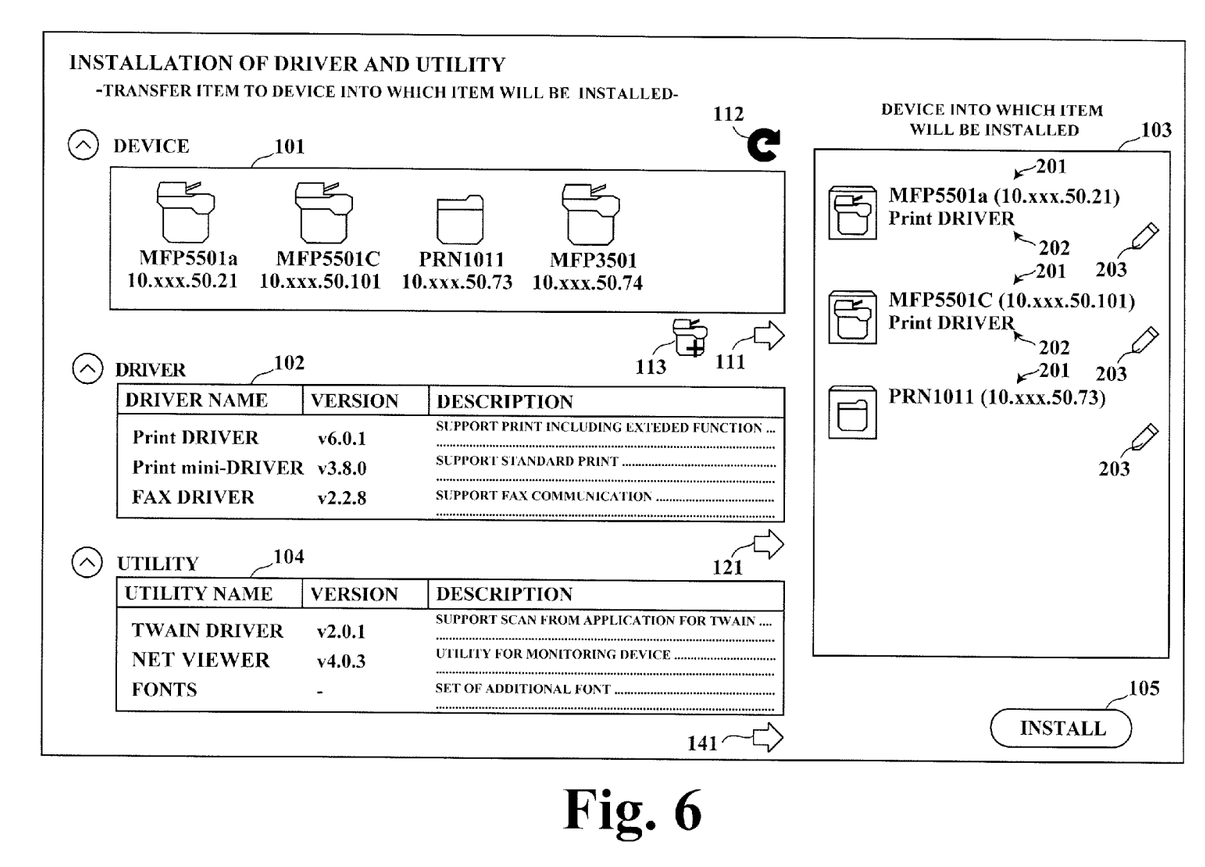
FIG. 6 is a schematic diagram explaining the selection of the device and the selection procedure for the driver for the selected device (3/3).

FIGS. 4-6 are schematic diagrams for explaining selection of the device and a selection procedure for the driver for the selected device.

If the installer program 31 is executed in the processor 15 in accordance with a specified operation of the user, the display control unit 52 causes the display device 12 to display such an operation screen as illustrated in FIG. 2. In addition, as illustrated in, for example, FIG. 4, the display control unit 52 causes the driver list of the driver program group 32 to be displayed in the second display area 102, and causes the utility list of the utility program group 33 to be displayed in the fourth display area 104. In addition, if the device list generation unit 51 generates the device list of the devices 2, the display control unit 52 causes the device list to be displayed in the first display area 101.

In addition, as illustrated in FIG. 4, in an initial state, the third display area 103 in the operation screen is blank.

If the user operates the input device 13, selects the plural devices, referred to as "MFP5501a", "MFP5501C", and "PRN1011" and displayed in the first display area 101, as illustrated in, for example, FIG. 4, and presses down the soft key 111, the display control unit 52 causes the selected devices to be displayed in the third display area 103 as illustrated in FIG. 5.

Next, the user operates the input device 13, selects the plural devices, referred to as "MFP5501a" and "MFP5501C" and displayed in the third display area 103, further selects the driver, referred to as "Print DRIVER" and displayed in the second display area 102, and presses down the soft key 121, the display control unit 52 causes the driver, referred to as "Print DRIVER", to be displayed in the third display area 103, corresponding to each of the devices referred to as "MFP5501a" and "MFP5501C", as illustrated in FIG. 6.

Note that, while one driver is selected from the driver list, a plurality of drivers may be selected. When the plural drivers are selected, if the soft key 121 is pressed down, the display control unit 52 causes the plural drivers to be displayed in the third display area 103, corresponding to each of the devices referred to as "MFP5501a" and "MFP5501C".

In addition, if the user operates the input device 13 and presses down the installation key 105 in a state illustrated in, for example, FIG. 6, the installation processing unit 53 installs "Print DRIVER" as the driver for the device, "MFP5501a", and installs "Print DRIVER" as the driver for the device, "MFP5501C".

Accordingly, the display control unit 52 based on the installer program 31 (a) causes the first display area 101, the second display area 102, and the third display area 103 to be displayed within one operation screen, (b) causes the device list to be displayed in the first display area 101, (c) causes the driver list to be displayed in the second display area 102, (d) causes one device 201 or the plural devices 201 selected from the device list displayed in the first display area 101 to be displayed in the third display area 103, and (e) causes one driver 202 or the plural drivers 202 to be displayed, the one driver 202 or the plural drivers 202 being selected, with respect to one of the displayed devices 201, from the driver list displayed in the second display area 102, and associated with one of the displayed devices 201. The installation processing unit 53 based on the installer program 31 installs the driver 202, displayed corresponding to the device 201 displayed in the third display area 103, as a driver for the device 201.

This enables the user to simultaneously select, with visual confirmation, the device where the driver is to be installed into the information processing device 1, and the driver to be installed for the device, if a plurality of drivers (for example, "Print DRIVER" and "FAX DRIVER") exist for one device (for example, "MFP5501a").

While various aspects and embodiments have been disclosed herein, other aspects and embodiments are possible. Other designs may be used in which the above-described components are each present.

For example, in the above-described embodiment, when the driver is selected from the driver list corresponding to the device displayed in the third display area 103, the display control unit 52 may determine whether or not the selected driver conforms to the displayed device. If the selected driver does not conform to the displayed device, the display control unit 52 may cause the display device 12 to display a warning. In this case, for example, each of the plural drivers includes conformity data indicating a device to which the driver conforms. The display control unit 52 determines, based on the conformity data, whether or not the selected driver conforms to the displayed device.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. A non-transitory recording medium including an installer program, wherein the installer program causes a computer within an information processing device to function as a device list generation unit configured to generate a device list of a device that communicates with the information processing device;

a display control unit configured to cause:

(i) a first display area, a second display area, a third display area, and a fourth display area to be displayed within one screen of the information processing device, the third display area being blank in an initial state, (ii) a soft key and an installation key to be displayed within the one screen, (iii) the device list to be displayed in the first display area, (iv) a driver list to be displayed in the second display area, (v) a utility list to be displayed in the fourth display area, (vi) the device selected from the device list in the second display area to be displayed in the third display area, when the soft key is activated, (vii) the driver selected from the driver list in the second display area to be displayed corresponding to the device displayed in the third display area, when the soft key is activated, and (viii) the utility selected from the utility list in the fourth display area to be displayed in the third display area, when the soft key is activated; and an installation processing unit configured to install, into the information processing device, one or more of the drivers or the utilities corresponding to the device displayed in the third display area, when the installation key is activated, wherein the display control unit is configured to cause an icon to be displayed corresponding to one of the devices displayed in the third display area, and cause a setting screen for inputting a setting value of the driver to be displayed if the icon is activated, wherein the setting screen includes a plurality of tabs for inputting the respective setting values of plural drivers when the plural drivers are displayed with being associated with one of the devices displayed in the third display area.

2. The non-transitory recording medium according to claim 1, wherein
when the driver is selected from the driver list, the display control unit is configured to determine whether or not the selected driver conforms to the displayed device.

3. The non-transitory recording medium according to claim 2, wherein
if the selected driver does not conform to the displayed device, the display control unit is configured to cause a warning to be displayed.

4. An installation method comprising:
generating a device list of a device that communicates with an information processing device;
displaying a first display area, a second display area, a third display area, and a fourth display area within one screen of the information processing device, the third display area being blank in an initial state;
displaying a soft key and an installation key to be displayed within the one screen;
displaying the device list in the first display area;
displaying a driver list in the second display area;
displaying a utility list in the fourth display area;
displaying in the third display area a device selected from the device list in the first display area, when the soft key is activated;
displaying in the third display area a driver selected from the driver list displayed in the second display area corresponding to the device displayed in the third display area, when the soft key is activated;
displaying in the third display area a utility selected from the utility list displayed in the fourth display area corresponding to the device displayed in the third display area, when the soft key is activated;
installing, into the information processing device, one or more of the drivers or the utilities corresponding to the device displayed in the third display area, when the installation key is activated;
displaying an icon corresponding to one of the devices displayed in the third display area; and displaying a setting screen for inputting a setting value of the driver if the icon is activated, wherein the setting screen includes a plurality of tabs for inputting the respective setting values of plural drivers when the plural drivers are displayed with being associated with one of the devices displayed in the third display area.

5. The installation method according to claim 4, further comprising:
determining whether or not the selected driver conforms to the displayed device, when the driver is selected from the driver list.

6. The installation method according to claim 5, further comprising:
displaying a warning, if the selected driver does not conform to the displayed device.

7. An information processing device having an associated display, the information processing device executing an installer program, wherein
the installer program causes a computer within an information processing device to function as
a device list generation unit configured to generate a device list of a device that communicates with the information processing device;
a display control unit configured to cause:
(i) a first display area, a second display area, a third display area, and a fourth display area to be displayed within one screen of the information processing device, the third display area being blank in an initial state, (ii) a soft key and an installation key to be displayed within the one screen, (iii) the device list to be displayed in the first display area, (iv) a driver list to be displayed in the second display area, (v) a utility list to be displayed in the fourth display area, (vi) the device selected from the device list in the first display area to be displayed in the third display area, when the soft key is activated, (vii) the driver selected from the driver list in the second display area to be displayed corresponding to the device displayed in the third display area, when the soft key is activated, and (viii) the utility selected from the utility list in the fourth display area to be displayed in the third display area, when the soft key is activated; and an installation processing unit configured to install, into the information processing device, one or more of the drivers or the utilities corresponding to the device displayed in the third display area, when the installation key is activated, wherein the display control unit is configured to cause an icon to be displayed corresponding to one of the devices displayed in the third display area, and cause a setting screen for inputting a setting value of the driver to be displayed if the icon is activated, wherein the setting screen includes a plurality of tabs for inputting the respective setting values of plural drivers when the plural drivers are displayed with being associated with one of the devices displayed in the third display area.

8. The information processing device to claim 7, wherein
when the driver is selected from the driver list, the display control unit is configured to determine whether or not the selected driver conforms to the displayed device.

9. The information processing device according to claim 8, wherein
if the selected driver does not conform to the displayed device, the display control unit is configured to cause a warning to be displayed.

* * * * *